(12) United States Patent
Cole et al.

(10) Patent No.: US 7,325,353 B2
(45) Date of Patent: Feb. 5, 2008

(54) MULTIPLE NOMOGRAPH SYSTEM FOR SOLVING RANGING AND BALLISTIC PROBLEMS IN FIREARMS

(76) Inventors: Brand D. Cole, 800 N. 2nd St., Canadian, TX (US) 79014; G. David Tubb, P.O. Box 1211, Canadian, TX (US) 79014

( * ) Notice: Subject to any disclaimer, the term of this patent is extended or adjusted under 35 U.S.C. 154(b) by 126 days.

(21) Appl. No.: 11/313,764

(22) Filed: Dec. 22, 2005

(65) Prior Publication Data

US 2006/0260171 A1    Nov. 23, 2006

Related U.S. Application Data

(60) Provisional application No. 60/683,546, filed on May 20, 2005.

(51) Int. Cl.
*F41G 1/38* (2006.01)
*F41G 1/473* (2006.01)

(52) U.S. Cl. .......................................... 42/119; 42/130
(58) Field of Classification Search .................. 42/111, 42/119, 122, 130, 131, 142; 33/265; D22/109; D16/132; 235/404–406
See application file for complete search history.

(56) References Cited

U.S. PATENT DOCUMENTS

| | | | |
|---|---|---|---|
| 1,107,163 A | 8/1914 | Grauheding | |
| 1,127,230 A | 2/1915 | Grauheding | |
| 1,190,121 A | 7/1916 | Critchett | |
| 2,154,454 A | 4/1939 | Joyce | |
| 3,682,552 A * | 8/1972 | Hartman | 356/3 |
| 3,782,822 A | 1/1974 | Spence | |
| 3,948,587 A | 4/1976 | Rubbert | |
| 4,263,719 A | 4/1981 | Murdoch | |
| 4,531,052 A * | 7/1985 | Moore | 235/404 |
| D306,173 S * | 2/1990 | Reese | D16/130 |
| 5,223,650 A | 6/1993 | Finn | |
| 5,491,546 A | 2/1996 | Wascher et al. | |
| 5,657,571 A | 8/1997 | Peterson | |
| D397,704 S | 9/1998 | Reese | |
| 5,920,995 A * | 7/1999 | Sammut | 42/122 |
| 5,960,576 A * | 10/1999 | Robinson | 42/90 |

(Continued)

FOREIGN PATENT DOCUMENTS

DE          3401855          7/1985

(Continued)

*Primary Examiner*—Bret Hayes
(74) *Attorney, Agent, or Firm*—Richard C. Litman

(57) ABSTRACT

The multiple nomograph system for solving ranging and ballistic problems in firearms includes a series of graphs or nomographs for the determination of a series of factors affecting the ballistic trajectory of a bullet in flight. The nomographs may be placed upon the reticle of a firearm scope, or provided on media external to the scope, as desired. The scope reticle includes at least one aiming point or aim point field to compensate for elevation and windage, with the vertical axis preferably being offset to compensate for precession at longer ranges. Stadia for determining angular target dimension(s) are included on the reticle, with a nomograph for determining apparent distance from the apparent dimensions being provided either on the reticle or external to the scope. Additional nomographs are provided for the determination and compensation of non-level slopes, non-standard density altitudes, and wind correction, either on the reticle or external thereto.

24 Claims, 8 Drawing Sheets

U.S. PATENT DOCUMENTS

| | | |
|---|---|---|
| 6,032,374 A | 3/2000 | Sammut |
| 6,269,581 B1 | 8/2001 | Groh |
| 6,453,595 B1 | 9/2002 | Sammut |
| 6,516,699 B2 * | 2/2003 | Sammut et al. ............ 89/41.17 |
| 6,591,537 B2 | 7/2003 | Smith |
| 6,729,062 B2 | 5/2004 | Thomas et al. |

FOREIGN PATENT DOCUMENTS

| | | |
|---|---|---|
| DE | 3834924 | 4/1990 |
| JP | 55-036823 | 3/1980 |

* cited by examiner

MULTIPLE NOMOGRAPH SYSTEM FOR SOLVING RANGING AND BALLISTIC PROBLEMS IN FIREARMS

CROSS-REFERENCE TO RELATED APPLICATION

This application claims the benefit of U.S. Provisional Patent Application Ser. No. 60/683,546, filed May 20, 2005.

BACKGROUND OF THE INVENTION

1. Field of the Invention

The present invention relates generally to systems and devices for resolving factors affecting the trajectory of a bullet fired from a firearm. More specifically, the present invention comprises a series of nomographs and charts providing graphical solutions for the most critical factors involved in the ballistic flight of a bullet or projectile, including elevation, windage, slope, atmospheric conditions including density altitude, and precession. The information may be presented on the scope reticle, or externally to the scope reticle and sight picture.

2. Description of the Related Art

Virtually all persons engaged in firearm shooting, whether hunting or target shooting, are well aware of at least some of the basic factors affecting the accuracy of a shot. The primary factors affecting shooting accuracy are the range or distance to the target and resulting arcuate trajectory (drop) of the bullet, and windage or lateral drift due to wind. The need to correct for these two factors is well known.

However, there are several other factors which result in lesser errors in shooting. Nevertheless, it is critical that these other factors be taken into consideration and compensated for, in order to produce an extremely accurate shot. These factors are especially critical at long ranges, i.e. approaching or over one thousand yards.

One factor which appears fairly often in the field, is slope. The difference in elevation between the firearm and the target can result in significant error, depending upon the elevation difference and the range of the shot. Still another factor seldom considered by shooters is precession (often called "spin drift") due to the angular change of the axis of the bullet in flight as it travels an arcuate ballistic flight path, and the spin imparted to the bullet due to the rifling of the gun barrel. While various corrections have been developed for most of these factors, most such corrections have been provided in the form of programmable electronic devices or earlier in the form of logbooks developed over time by the serious shooter.

Other factors are atmospheric variables, specifically altitude and barometric pressure, temperature, and humidity. These variables have traditionally been utilized to alter the ballistic coefficient (BC) of a projectile for specific atmospheric conditions prior to calculating the trajectory. (BC is a scaling factor against a well-known, standard projectile.) These atmospheric variables all affect the aerodynamic drag on the projectile, thus altering the trajectory.

Certain telescopic firearm sight reticles have been developed in the past, with various markings to assist the shooter in determining the apparent range of a target. A nearly universal system has been developed by the military for artillery purposes, known as the "mil-radian," or "mil," for short. This system has been adopted by most of the military for tactical (sniper) use, and subsequently adopted by most of the sport shooting world. The mil is an angle having a tangent of 0.001. This provides a means of measuring the distance to a target in terms of apparent target height or span (or height or span of a known object in the vicinity of the target). For example, a target distance of one thousand yards would result in one mil subtending a height of one yard, or thirty six inches, at the target. This is about 0.058 degree, or about 3.5 minutes of angle. It should be noted that although the term "mil-radian" implies a relationship to the radian, the mil is not exactly equal to an angle of one one thousandth of a radian, which would be about 0.057 degree or about 3.42 minutes of angle. The "mil-dot" system, based upon the mil, is in wide use in scope reticle marking, but does not provide any means per se of determining the distance to a target without having at least a general idea of the target size, and performing a mathematical calculation involving these factors.

Another angular measurement system used in shooting is known as the "minute of angle," or MOA. This system measures the height or distance subtended by an angle of one minute, or one sixtieth of a degree. At a range of one hundred yards this subtended span is slightly less than 1.05 inches, or about 10.47 inches at one thousand yards range. It will be seen that the distance subtended by the MOA is substantially less than that subtended by the mil at any given distance, i.e. thirty six inches for one mil at one thousand yards but only 10.47 inches for one MOA at that range.

Both of the above described systems are in use for scope reticle marking, and either may be incorporated with the present nomograph system. However, both are angular measurements which require that some dimension of the target (or object near the target) be known in order to determine the distance to the target by means of the mil or MOA angular systems. While this is also true of the present nomograph system, the present system also provides a nomograph or chart for determining apparent distance to the target, as well as nomographs or charts for solving various other ballistic problems in firearms.

In addition to the above general knowledge of the field of the present invention, the present inventors are also aware of certain foreign references which relate generally to their invention. Japanese Patent Publication No. 55-36,823 published on Mar. 14, 1980 to Raito Koki Seisakusho KK describes (according to the drawings and English abstract) a variable power rifle scope having a variable distance between two horizontally disposed reticle lines, depending upon the optical power selected. The distance may be adjusted to subtend a known span or dimension at the target, with the distance being displayed numerically on a circumferential external adjustment ring. A prism transmits the distance setting displayed on the external ring to the eyepiece of the scope, for viewing by the marksman.

German Patent Publication No. 3,401,855 published on Jul. 25, 1985 to Carl Walther GMBH describes (according to the drawings and English abstract) a toroidal ring attached to the eyepiece end of a firearm scope, with the ring being half filled with a highly visible liquid. Aligning the liquid level with the ends of the horizontal stadia of the reticle, assures that the firearm scope is leveled axially.

German Patent Publication No. 3,834,924 published on Apr. 19, 1990 to Siegfried Trost describes (according to the drawings and English abstract) a scope leveling device similar to that of the '855 German Patent Publication noted immediately above, but containing a weight in a semicircular tubular segment, rather than a liquid in a toroidal ring.

None of the above inventions and patents, taken either singly or in combination, is seen to describe the instant invention as claimed. Thus, a multiple nomograph system for solving ranging and ballistic problems in firearms and solving the aforementioned problems is desired.

SUMMARY OF THE INVENTION

The multiple nomograph system for solving ranging and ballistic problems in firearms enables a marksman to rapidly determine the solutions for a number of factors affecting the ballistic flight of a bullet, without need for mathematical calculations or electronic devices. The present graphical system may be displayed upon the reticle of a firearm scope, allowing the marksman to keep his eye on the scope sight at all times. Alternatively, the graphs may be presented on a medium external to the scope, if so desired. While shooters may wish to use other means to solve the various problems associated with the trajectory of a bullet, e.g. logbooks or records of previous experiences or an electronic computer program, the present system enables a marksman to quickly and easily solve firearm ballistic problems without need of electronic devices and/or cumbersome logbooks or similar records.

The present system includes a firearm scope reticle marked in mil-radians, minutes of angle, or other marking system as desired. Separate stadia are provided with the reticle, allowing the marksman to gauge the angle subtended by an object (target, etc.) of known size to determine the apparent distance to the target. A separate nomograph (either within the scope reticle, or external to the scope) is provided for the marksman to determine the range to the object of known size. Preferably, the vertical centerline (and other vertical lines or patterns) of the scope reticle is skewed to compensate for gyroscopic precession or "spin drift" of the bullet, particularly at longer ranges. Lateral markings are provided for windage and target lead. Additional nomographs are provided for the determination of slope, i.e. difference in elevation between the firearm and the target, and density altitude. The slope graph component of the present invention is also useful for determining the direct crosswind component for wind crossing the flight path of the bullet at an oblique angle. The present multiple nomograph system could also be used to compensate for additional factors as well, e.g. Coriolis effect, with additional input such as latitude and direction of aim.

The present inventors have developed a methodology of using the concept of density altitude for use as a single variable to replace the conventionally utilized three variables comprising altitude (barometric pressure), temperature, and humidity. This concept provides powerful simplification in that it allows a single standard trajectory to be calculated or developed, and then provide for the determination of simple adjustments to be made to that trajectory (by means of density altitude correction graphs) for various density altitudes. This is in contrast to the conventional ballistic calculations whereby the atmospheric variables are used to "correct" the ballistic coefficient (BC) of the projectile prior to calculating the trajectory. Thus, conventionally, the complex and time-consuming trajectory calculation had to be made any time an atmospheric variable changed. The difficulty of this conventional method generally kept discussion of changes resulting from atmospheric changes to a "qualitative" discussion, whereas the method of the present invention provides a quantitative consideration of the factors involved.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a multiple nomograph system for solving ranging and ballistic problems in firearms, and is adapted particularly for use with hand held firearms having magnifying scope sights. The present system comprises a series of nomographs or charts in combination with an aiming point or field disposed upon a firearm scope reticle, with the various nomographs or charts providing graphical solutions for ballistic problems such as elevation (bullet drop), windage, differential slope between the firearm and target, and density altitude (air density).

Figure 1:
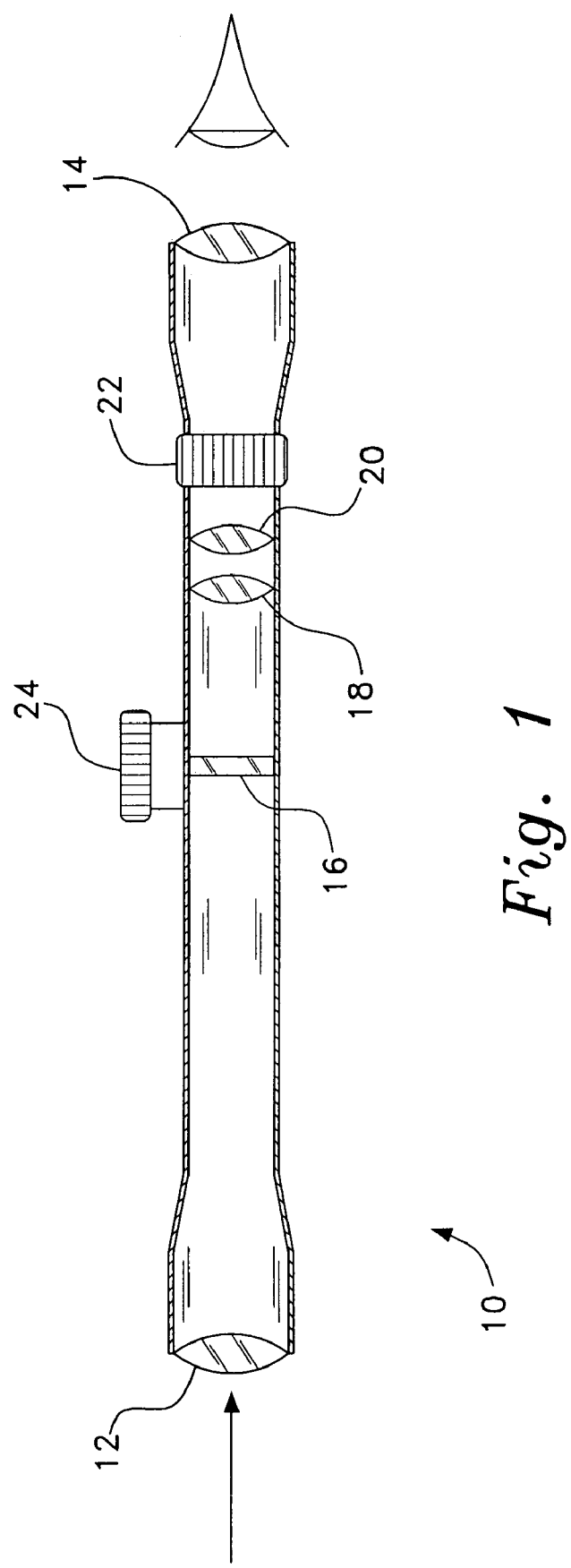
FIG. 1 is a side elevation view in section of a variable power telescopic sight incorporating a reticle according to the present invention.

FIG. 1 provides a side elevation view in section of an exemplary variable power firearm scope or telescopic sight 10, with which the present system may be used. The scope 10 generally includes an objective lens 12 and ocular or eyepiece lens 14 at opposite ends of the device, with a reticle screen or glass 16 disposed therebetween. Variable power scopes also include an erector lens 18 and power adjustment (zoom) lens 20, with some means for adjusting the relative position of the zoom lens 20 to adjust the magnification power as desired, e.g. a circumferential adjustment ring 22 which threads the zoom lens 20 toward or away from the erector lens 18. Variable power scopes 10, as well as other types of telescopic sight devices, also often include a control 24 for adjusting the reticle screen 16 and position of the aiming point or center of the aim point field thereon (or adjusting the alignment of the scope 10 with the firearm), to adjust for elevation (bullet drop) as desired. Scopes also conventionally include a windage adjustment control as well.

While an exemplary conventional variable power scope 10 is used in the illustrations, it will be understood that the present system may be used with other types of scopes in lieu of the variable power scope 10. For example, fixed power scopes are often used by many hunters and target shooters. Such fixed power scopes have the advantages of economy, simplicity, and durability, in that they eliminate at least one lens and a positional adjustment for that lens. Such a fixed power scope may be suitable for many marksmen who generally shoot at relatively consistent ranges and targets. More recently, digital electronic scopes have been developed, which operate using the same general principles as digital electronic cameras. The present multiple nomograph system may be employed with these other types of scopes, as well as with the variable power scope 10 of FIG. 1.

Variable power scopes include two focal planes. The reticle screen or glass 16 for the present multiple nomograph system is preferably positioned at the first or front focal plane between the objective lens 12 and erector lens 18, in order that the reticle thereon will change scale correspondingly with changes in magnification as the power of the scope is adjusted. This results in reticle divisions subtending the same apparent target size or angle, regardless of the magnification of the scope. In other words, a target subtending two reticle divisions at a relatively low magnification adjustment, will still subtend two reticle divisions when the power is adjusted, to a higher magnification, at a given distance from the target. This reticle location is preferred for the present system when used in combination with a variable power firearm scope.

However, the reticle screen may be placed at the second or rear focal plane between the zoom lens 20 and eyepiece 14, if so desired. Such a second focal plane reticle will remain at the same apparent size regardless of the magnification adjustment to the scope, which has the advantage of providing a full field of view to the reticle at all times. However, the reticle divisions will not consistently subtend the same apparent target size with changes in magnification, when the reticle is positioned at the second focal plane in a variable power scope. Accordingly, it is preferred that the present system be used with first focal plane reticles in variable power scopes, due to the difficulty in using such a second focal plane reticle in a variable power scope.

Figure 2:
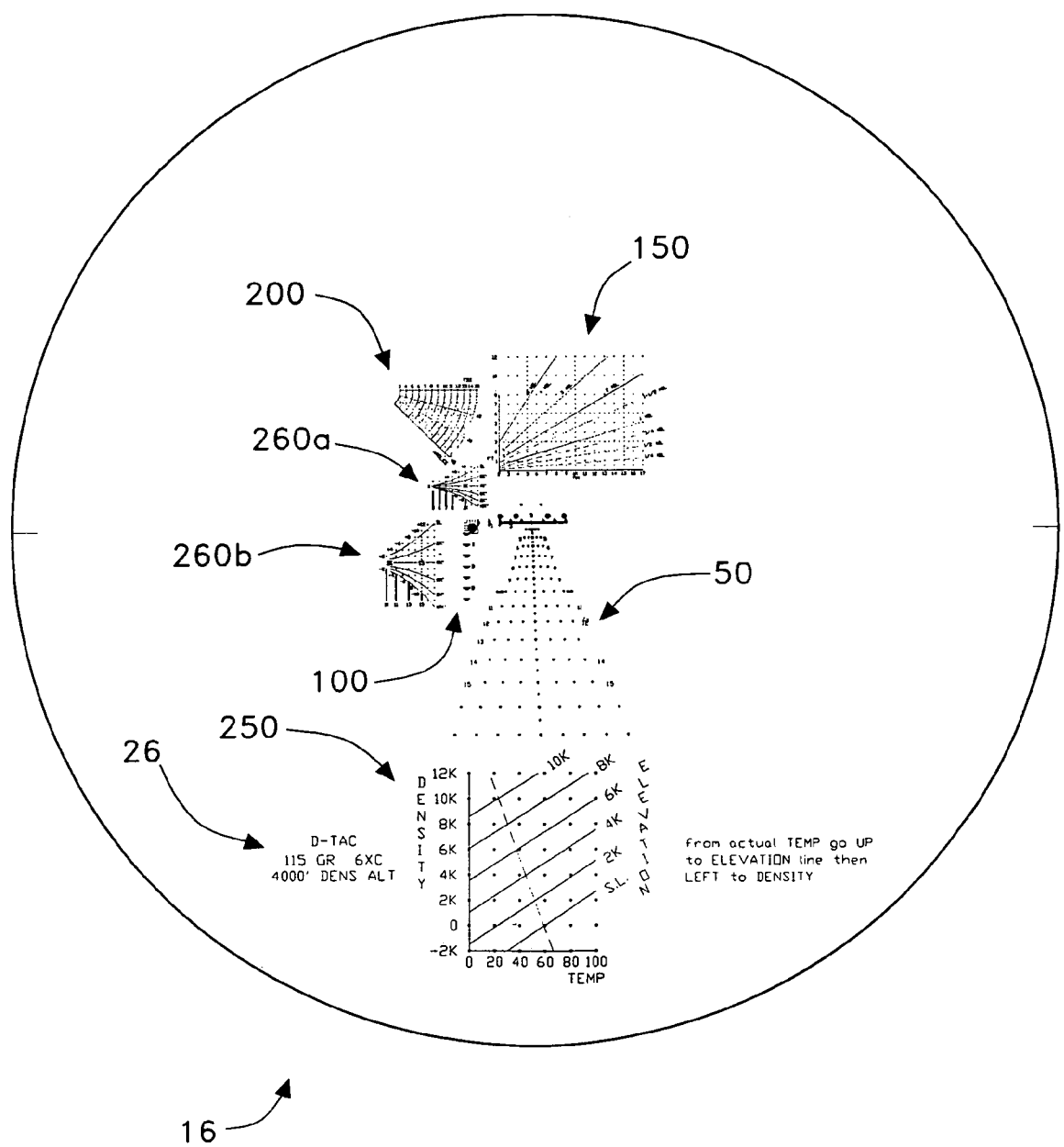
FIG. 2 is a sight picture of a firearm scope reticle incorporating a series of nomographs and other features of the present system.

FIG. 2 provides an exemplary sight picture of a reticle screen or glass 16 incorporating all of the nomographs and aiming points or fields of the present multiple nomograph system. It will be seen that the multiple nomographs of the present system will only be valid for a specific ballistic flight path or trajectory for a bullet or other projectile. The nomographs and fields comprise an elevation and windage aim point field 50; horizontal and vertical angular measurement stadia 100; a distance v. angular measurement nomograph 150, corresponding to the angular measurement stadia 100; a slope and wind correction nomograph 200; and a density altitude determination chart 250 and a set of density altitude ballistic correction nomographs 260a and 260b. The scale of these nomographs 50 through 260 is relatively small, as would be the case at a relatively low magnification power in a variable power scope. However, FIGS. 3 through 7 provide enlarged views of each of the nomographs of FIG. 2, as they would appear under higher magnification when the reticle screen 16 is positioned at the first focal point of the scope.

The flight path or trajectory is also affected by a number of additional factors, including the ballistic coefficient (BC) of the projectile, the muzzle velocity (MV), and atmospheric conditions. Accordingly, a set of nomographs constructed in accordance with the present invention will be precisely valid for one, and only one, combination of such factors, but usable across a spectrum of similar variables. A legend 26 may be provided at some point in the reticle field 16, as shown in FIG. 2, and/or with other separate nomograph sheets or displays, for the marksman to correlate the appropriate nomographs with the corresponding firearm and ammunition.

It will also be seen that with the exception of the elevation and windage aim point field 50 and horizontal and corresponding vertical angular measurement stadia 100, all other nomographs and charts may be disposed externally to the viewing field or reticle of the firearm scope, if so desired. For example, they may be placed on paper (generally as presented in FIGS. 4 through 7) or plastic sheet media, or disposed in a spotting scope or device separate from the firearm scope, if so desired. The advantage of placing all of the aim points, fields, nomographs, and charts 50 through 260 on the scope reticle 16 is that a single marksman may view and utilize all of these components in calculating the aiming point to be used for the target, without removing his eye from the target being viewed through the scope. Also, while the present system may be used in combination with electronic viewing and calculating means, it is not electronic per se, and does not require the use of electronic optical or calculating devices. This can be a definite advantage in the field, where any problems occurring with such electronic devices are unlikely to be solvable.

Figure 3:
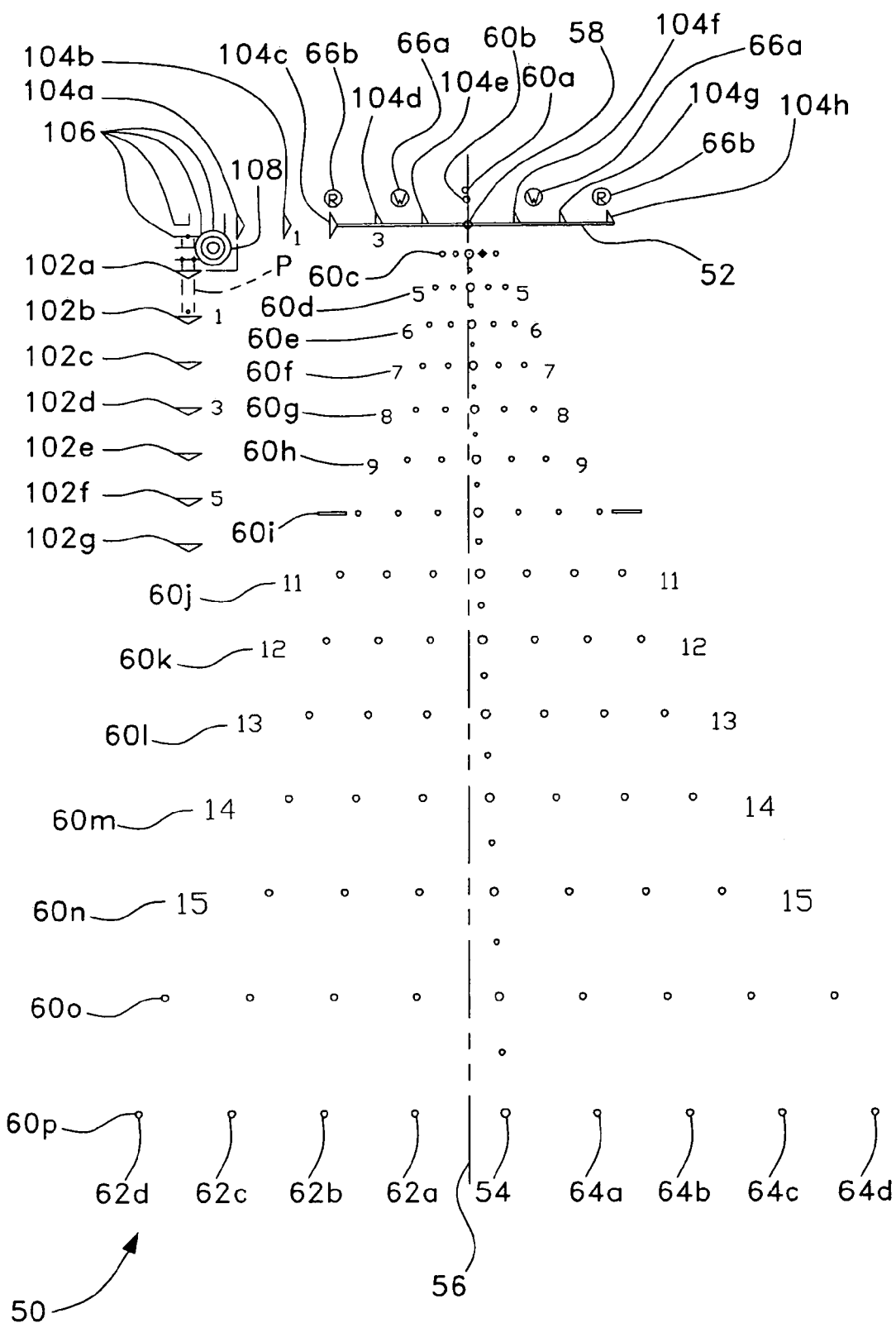
FIG. 3 is a detailed view of the target aiming field or dot pattern and apparent target angular dimension stadia placed on the scope reticle and used with the present multiple nomograph invention.

FIG. 3 provides a detailed view of an exemplary elevation and windage aim point field 50, with the accompanying horizontal and vertical angular measurement stadia 100. The aim point field 50 must be located on the scope reticle, as the marksman uses the aim point field 50 for aiming at the target as viewed through the scope and its reticle. The aim point field 50 comprises at least a horizontal line or crosshair 52 and a substantially vertical line or crosshair 54, which in the case of the field 50 of FIGS. 2 and 3 is represented by a line of substantially vertical dots. A true vertical reference line 56 is shown on the aim point field 50 of FIG. 3, and may comprise the vertical crosshair of the field 50 if so desired.

It will be noted that the substantially vertical dot line 54 is skewed somewhat to the right of the true vertical reference line 56. This is to compensate for gyroscopic precession or "spin drift" of the bullet in its trajectory. Most rifle barrels manufactured in the U.S. have rifling which spirals to the right, or clockwise, from the chamber to the muzzle of the barrel. This imparts a corresponding clockwise spin to the bullet. As the bullet travels an arcuate trajectory in its ballistic flight between the muzzle and the target, the longitudinal axis of the bullet will deflect angularly to follow that arcuate trajectory. The spin of the bullet results in gyroscopic precession ninety degrees to the arcuate trajectory, causing the bullet to deflect to the right. This effect is seen most clearly at relatively long ranges, where there is substantial arc to the trajectory of the bullet. The offset or skewing of the vertical dot line 54 to the right, results in the marksman correspondingly moving the alignment slightly to the left in order to position one of the dots of the line 54 on the target (assuming no windage correction). This has the effect of correcting for the rightward deflection of the bullet due to gyroscopic precession.

Another factor which may affect the trajectory of a bullet, is Coriolis effect. This is an apparent curvature of the flight path or trajectory of an object due to the rotation of the earth during the flight of the object. Coriolis effect is dependent upon latitude and upon the direction of flight. As Coriolis effect is dependent upon both the latitude and the direction of the shot, it is beyond the scope of the present invention to incorporate correction for Coriolis effect. However, additional nomograph(s) could be developed in accordance with the present invention to take into account Coriolis effect, if so desired.

The horizontal crosshair 52 and vertical dot row 54 define a single aim point 58 at their intersection. The present multiple nomograph system is operable with a scope reticle having such a single aim point 58, but greater utility is provided by means of a multiple aim point field such as the aim point field 50 shown in detail in FIG. 3. The multiple aim point field 50 is formed of a series of horizontal rows 60a, 60b, 60c, etc. and generally vertical (but spreading as they descend) left side columns 62a, 62b, 62c, etc. and right side columns 64a, 64b, 64c, etc. of aiming dots (which may be small circles or other shapes, in order to minimize the obscuration of the target). It will be noted that the two uppermost horizontal rows 60a and 60b actually comprise only a single dot each, as they provide relatively close aiming points at only one hundred and two hundred yards, respectively. The aim point field 50 is configured for a rifle and scope system which has been "zeroed" (i.e., adjusted to exactly compensate for the drop of the bullet during its flight) at a distance of three hundred yards, as evidenced by the primary horizontal crosshair 52. Thus, a marksman aiming at a closer target must lower his aim point to one of the dots 60a or 60b slightly above the horizontal crosshair 52, as relatively little drop occurs to the bullet in such a relatively short flight.

Most of the horizontal rows, e.g. rows 60d, 60e, 60f, 60g, down to row 60n, are numbered to indicate the range in hundreds of yards for an accurate shot using the dots of that particular row. The row 60i has a horizontal mark to indicate a range of one thousand yards. It will be noted that the spacing between each horizontal row 60c, 60d, 60e, 60f, etc., gradually increases as the range becomes longer and longer. This is due to the slowing of the bullet and increase in vertical speed due to the acceleration of gravity during its flight. The alignment and spacing of the horizontal rows compensates for these factors, and assures that the vertical impact point of the bullet will be accurate at the selected range.

In a similar manner, the generally vertical columns 62a, 62b, 64a, 64b, etc., spread as they extend downwardly to greater and greater ranges. These generally vertical columns compensate for windage, i.e. the lateral drift of a bullet due to any crosswind component. A crosswind will have an ever greater effect upon the path of a bullet with longer and longer range or distance. Accordingly, the vertical columns spread with greater ranges or distances, with the two inner columns 62a, 64a closest to the central column 54 being spaced to provide correction for a five mile per hour crosswind component, the next two adjacent columns 62b, 64b providing correction for a ten mile per hour crosswind component, etc. In addition, a moving target must be provided with a "lead," somewhat analogous to the lateral correction required for windage. The present scope reticle includes approximate lead indicators 66a (for slower walking speed, indicated by the "W") and 66b (farther from the central aim point 58 for running targets, indicated by the "R"). These lead indicators 66a and 66b are approximate, with the exact lead depending upon the velocity component of the target normal to the bullet trajectory and the distance of the target from the firearm.

In order to use the above described elevation and windage aim point field 50, the marksman must have a reasonably close estimate of the range to the target. This is provided by means of the evenly spaced horizontal and vertical angular measurement stadia 100 disposed upon the reticle field 16 along with the aim point field 50. The stadia 100 comprise a vertical row of stadia alignment markings 102a, 102b, etc., and a horizontal row of such markings 104a, 104b, etc. It will be noted that the horizontal markings 104a, etc. are disposed along the horizontal reference line or crosshair 52, but this is not required; the horizontal marks could be placed at any convenient location on the reticle as desired.

Each adjacent mark, e.g. vertical marks 102a, 102b, etc. and horizontal marks 104a, 104b, etc., are evenly spaced from one another and subtend precisely the same angle therebetween, e.g. one mil, or a tangent of 0.001. Other angular definition may be used as desired, e.g. the minute of angle or MOA system discussed in the Description of the Related Art further above. Any system for defining relatively small angles may be used, so long as the same system is used consistently for both the stadia 100 and the distance v. angular measurement nomograph 150.

The stadia system 100 is used by estimating some dimension of the target, or of an object close to the target. For example, a hunter may note that the game being sought is standing near a fence line having a series of wood fence posts. The hunter recognizes that the posts are about four feet tall, from prior experience. (Alternatively, he could estimate some dimension of the game, e.g. height, length, etc., but larger dimensions, e.g. the height of the fence post, are easier to gauge.) The hunter places the top of a post P (shown in broken lines along the vertical marks 102a, 102b, etc.) within the fractional mil marks 106 of the stadia 100, and adjusts the alignment of the firearm and scope vertically to place the base of the post P upon a convenient integer alignment mark, e.g. the second mark 102b. The hunter then knows that the post P subtends an angular span of one and three quarter mils, with the base of the post P resting upon the one mil mark 102b and the top of the post extending to the third of the quarter mil marks 106. Finer resolution of the angle may be achieved by comparing the top of the post P (or other object) with the one eighth mil "bulls-eye" 108 located within the quarter mil marks 106. It should be noted that the "bulls-eye" 108 is NOT an aiming point, but rather a fractional mil angular scale used with the fractional horizontal and vertical angular measurement stadia 106. The horizontal mil marks 104a, 104b, etc., along with the central aim point 58 positioned between the two horizontal marks 104e and 104f, are used similarly for determining a horizontal angle subtended by an object.

It should be noted that each of the stadia markings 102 and 104 comprises a small triangular shape, rather than a circular dot or the like, as is conventional in scope reticle markings. The polygonal stadia markings of the present system place one linear side of the polygon (preferably a relatively flat triangle) normal to the axis of the stadia markings, e.g. the horizontal crosshair 52. This provides a precise, specific alignment line, i.e. the base of the triangular mark, for alignment with the right end or the bottom of the target or adjacent object, depending upon whether the length or the height of the object is being ranged. Conventional round circles or dots are subject to different procedures by different shooters, with some shooters aligning the base or end of the object with the center of the dot, as they would with the sighting field, and others aligning the edge of the object with one side of the dot. It will be apparent that this can lead to errors in subtended angle estimation, and therefore in estimating the distance to the target. The present triangular (or other polygonal) stadia markings, with their flat bases normal to the object being ranged, provide a precise and specific alignment edge which is not open to erroneous interpretation.

With both the angle subtended and the height of the object being known, the distance to the object may be determined mathematically or using other means. The present multiple nomograph system enables the hunter or marksman to determine the distance to the target by means of the distance v. angular measurement nomograph 150, shown in FIG. 4, without need to resort to complex mathematics or mechanical or electronic calculation devices. The distance/angular measurement nomograph 150 of FIG. 4 includes a vertical linear distance scale 152 marked in feet for scaling the height or span of the target or adjacent object, and a horizontal linear distance or range scale 154 for determining the range or distance from the firearm to the target. A series of sloping equivalent mil-radian lines 156a, 156b, 156c, etc. extend from the origin at the lower left of the nomograph (truncated in order to save space on the graph 150, as elevation correction for bullet drop at less than 200 yards is generally negligible with most higher powered firearms). A horizontal and vertical grid pattern 158 of dots or other marks may be provided to facilitate alignment using the nomograph 150, if so desired.

Figure 4:
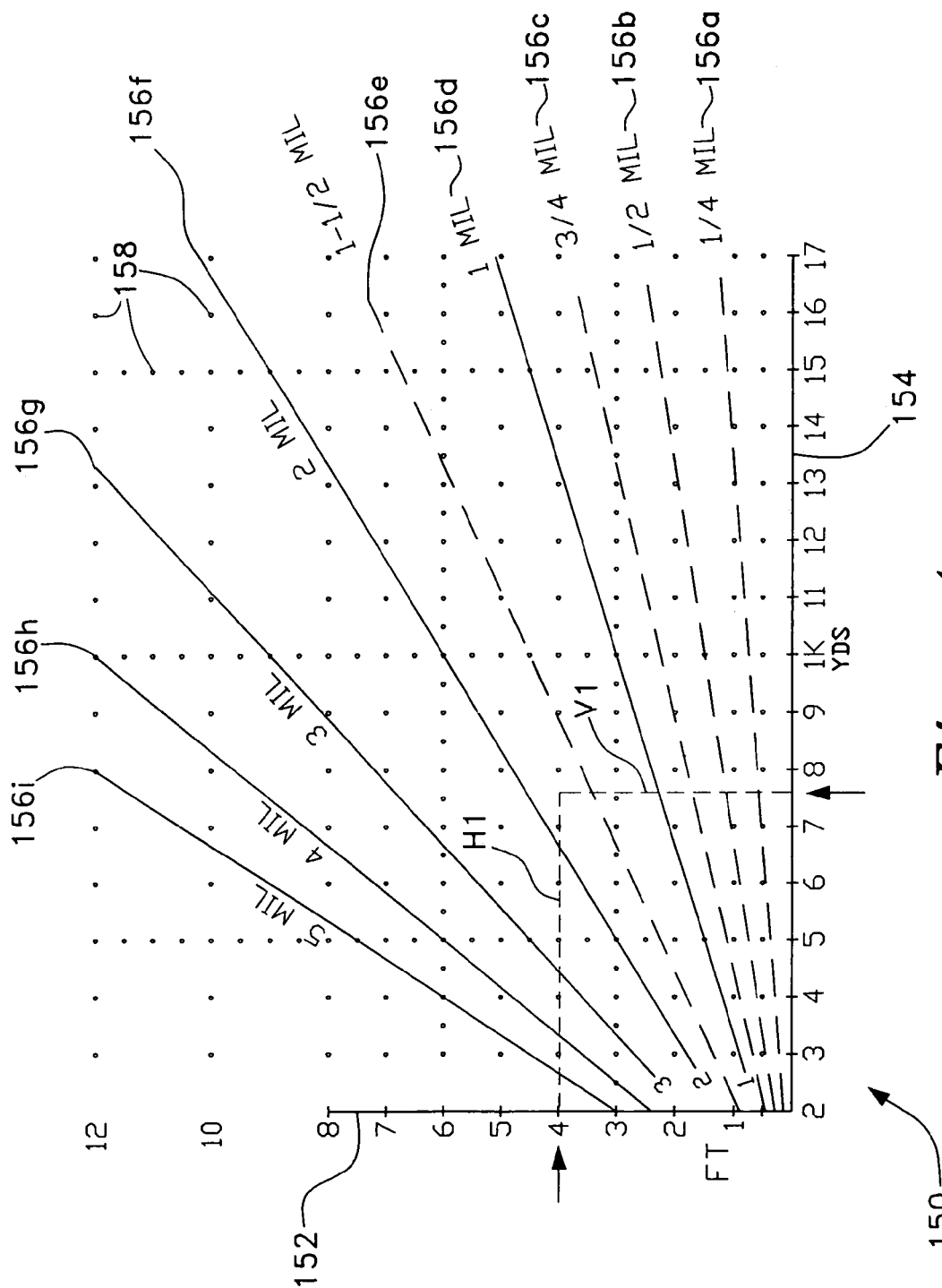
FIG. 4 is a detailed view of the angle vs. apparent distance nomograph of the present invention.
Figure 5:
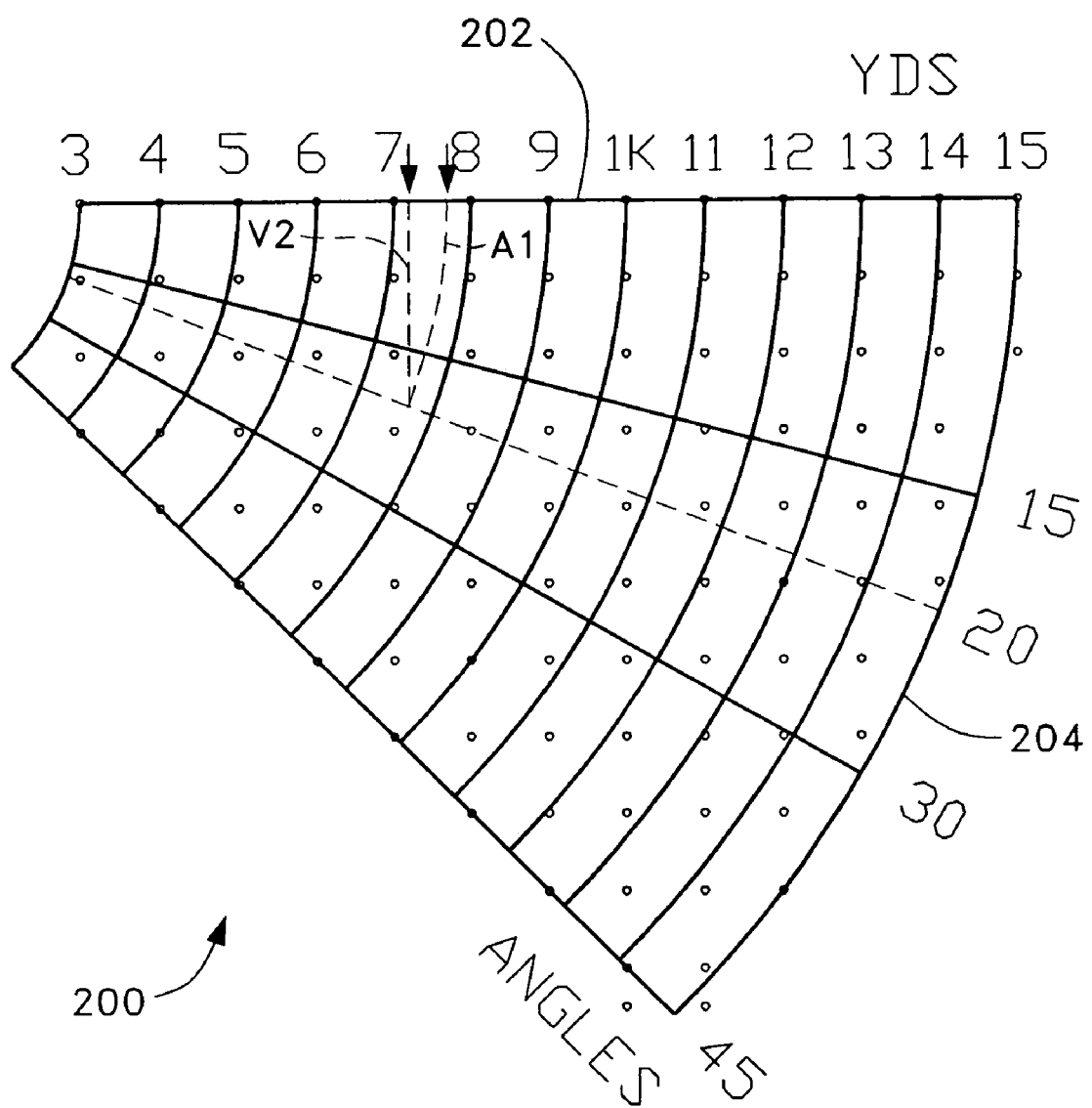
FIG. 5 is a nomograph for compensating for non-level slope between the firearm and the target.

The distance v. angular measurement nomograph 150 of FIG. 4 is used by first noting the height or span of the target or other object sighted, e.g. the four foot tall fence post used as an example in the discussion of the angular measurement stadia 100 shown in FIG. 3 and discussed further above, along the vertical scale 152 along the left side of the nomograph. A horizontal line H1 is then visualized (or drawn) from that point along the vertical scale 152, until it intersects the appropriate sloped mil line equal to the number of mils subtended by the object. In the example of the fence post described further above, the post subtended an angle of 1¾ mils. Thus, one would extend the horizontal line H1 from the four foot point of the vertical scale 152 until it intersects a point about midway between the 1½ mil line and the 2 mil line. A vertical line V1 is then dropped from that point to intersect the horizontal range scale 154 to indicate the apparent range to the object and/or its adjacent target, i.e. about 770 yards in this example.

The vertical scale 152 of the nomograph 150 of FIG. 4 is marked in length or distance units of feet, with the horizontal scale 154 being marked in yards and the sloping lines 156a, etc. being in mils. However, it will be seen that any linear distance systems may be used for the horizontal and vertical scales as desired, e.g. metric, etc. In a similar manner, any angular measurement system may be used for the sloping angular measurement lines of the nomograph 150, as desired. The only restriction is that the units used be consistent between different components of the present multiple nomograph system, as appropriate. In the case of the distance v. angular measurement nomograph 150 of FIG. 4, if it were to be calibrated e.g. using the metric system and minutes of angle (MOA), then the horizontal and vertical scales 102 and 104 of the angular measurement stadia 100 and the horizontal and vertical dot rows 60, 62, and 64 of FIG. 3 would require corresponding calibration in like units.

Once the apparent range to the target has been determined, the marksman or hunter must consider any difference in elevation (height) between the firearm and the target, and input a corresponding correction in his sight picture. The slope and wind correction nomograph 200 of FIG. 5 serves this purpose. Obviously, it is not possible for the hunter or marksman to check the elevation at the target, but he can measure at least approximately the slope (either up or down) between himself and the target. The slope/wind correction nomograph 200 includes a distance scale 202 in yards (or other units, as desired, so long as they are compatible with the distance units used in other charts and graphs) and an arcuate slope scale 204, below the distance scale.

The slope and wind correction nomograph 200 is used by first locating the apparent range to the target, e.g. 770 yards to continue the example initially developed further above, along the distance scale 202. An arcuate line A1 is then extended from the 770 yard point, parallel to the arcuate curves of the slope scale 204 until reaching the slope angle between the firearm and the target, e.g. twenty degrees. At this point, a vertical line V2 is extended upwardly from the bottom of the curved line A1 until reaching the horizontal scale 202, with the intersection of the vertical line V2 with the horizontal scale 202 indicating the horizontal distance from the firearm to the target, i.e. about 710 yards. It does not matter whether the slope is upward or downward, when using the nomograph 200 of FIG. 5 for determining the horizontal range. The correction used by the marksman is the same for any given degree of slope and slope distance, regardless of upward or downward slope.

The slope and wind correction nomograph 200 is quite useful for determining wind vectors as well, as indicated by its name. For example, a hunter may be facing a quartering 15 mph wind, coming from his left front at about a 45 degree angle. The hunter needs to know what the crosswind component is, so he can correct for windage. The hunter need only find the wind strength along the horizontal distance line 202, follow the arcuate curve 204 around to the 45 degree radial, and draw a line straight up from that point until intersecting the horizontal distance line 202 to find a crosswind component of between 10 and 11 mph.

Figure 6:
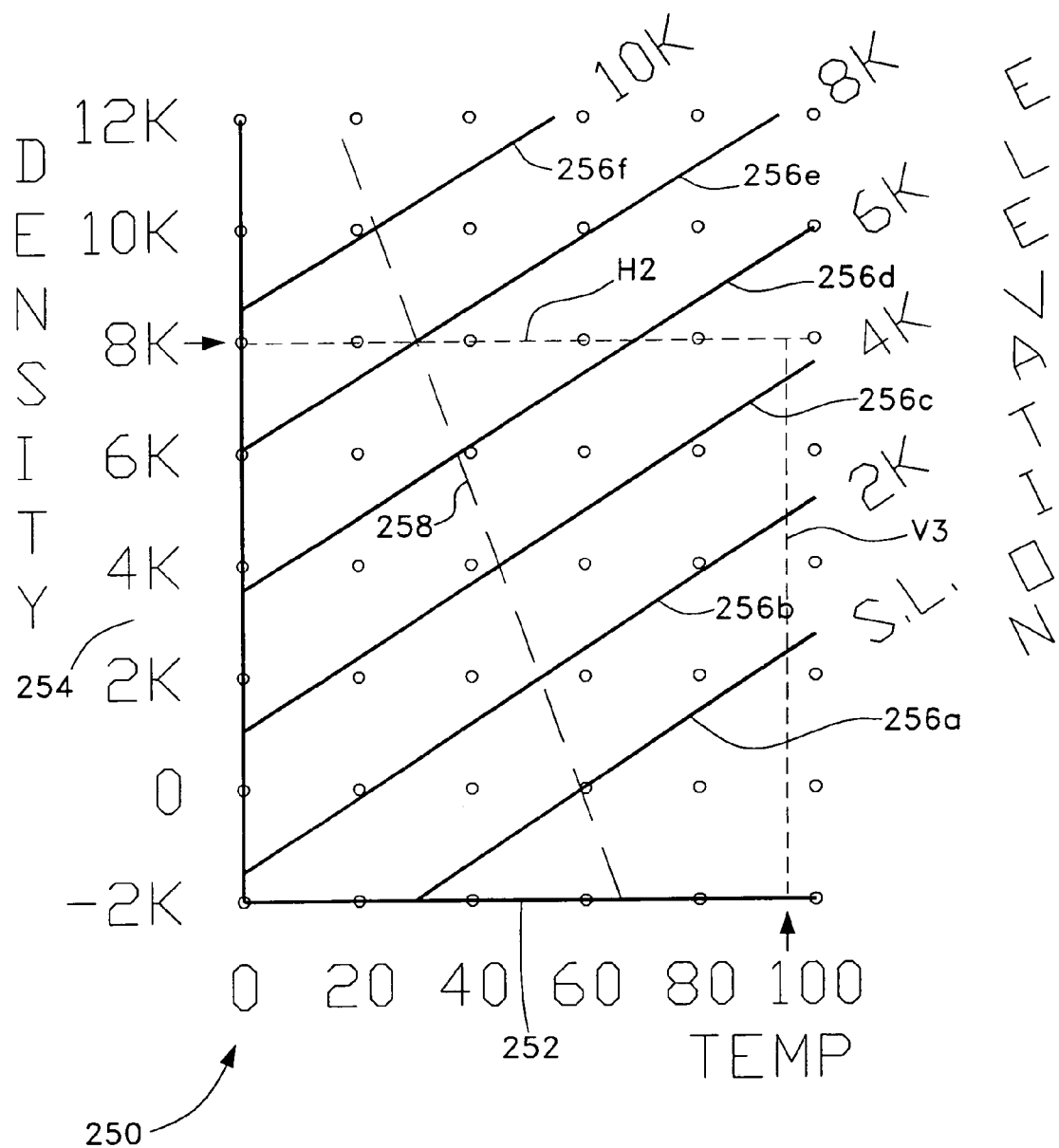
FIG. 6 is a detailed view of a nomograph or chart for the determination of density altitude, for placement either on the scope reticle or external to the reticle.
Figure 7A:
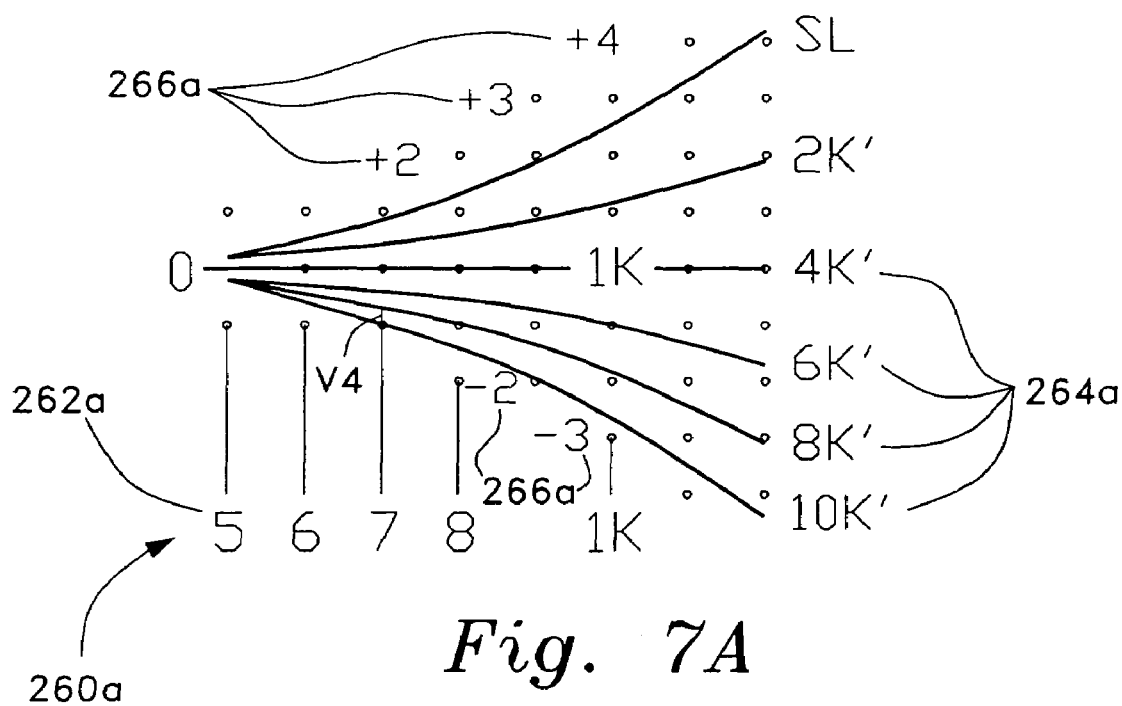
FIGS. 7A and 7B are detailed views of two nomographs for two different ranges, used with the density altitude nomograph of FIG. 6.
Figure 7B:
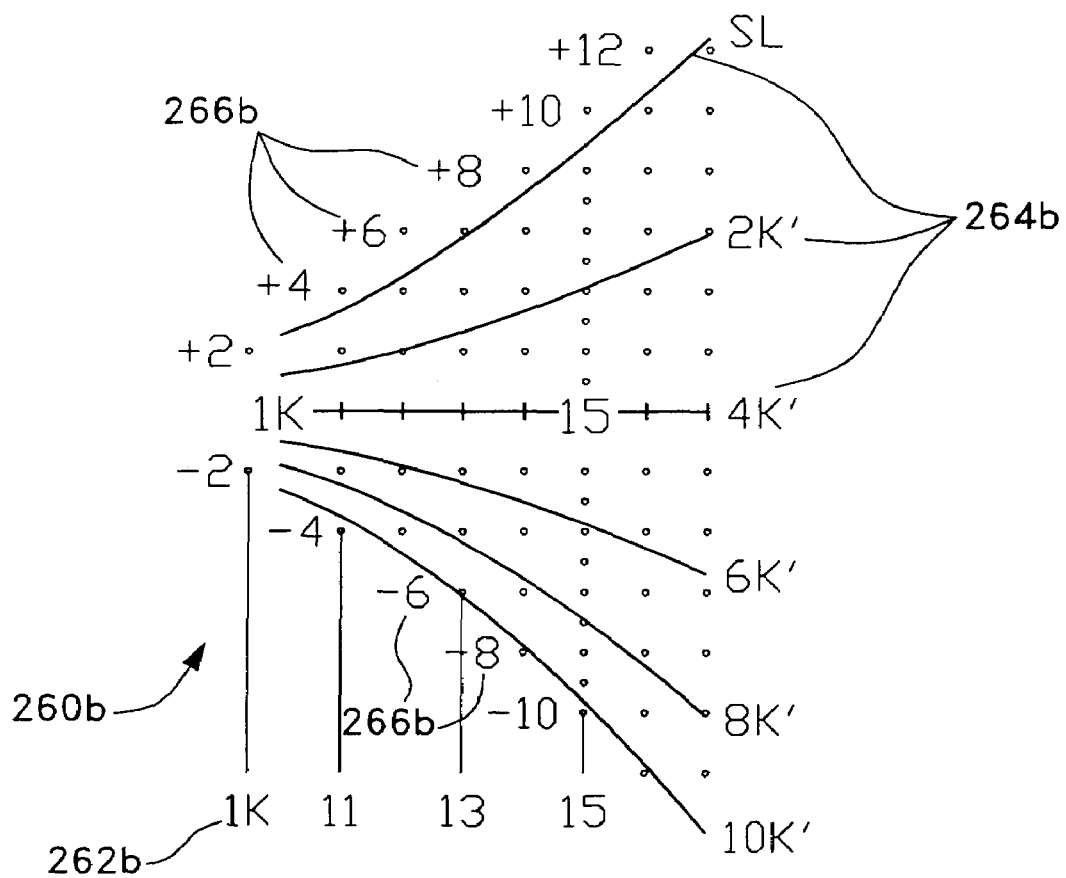

FIGS. 6 through 7B provide illustrations of a series of nomographs or charts used for determining the effects of density altitude upon the flight or trajectory of a bullet. Air density can have a measurable effect upon a bullet's or projectile's flight, particularly as the air density differs from uniformly accepted standards. As air density decreases with altitude, i.e. the air becomes thinner and less dense, the aerodynamic drag upon a bullet in flight decreases accordingly. This is particularly true in supersonic flight, which is practically all the useful flight trajectory of a projectile. However, air density is also affected by temperature, with warmer air being less dense, and barometric pressure changes, as well as the relatively minor effect of humidity.

The importance of atmospheric conditions upon the flight of a bullet or other projectile was recognized as far back as 1905 by the U.S. military. Obviously, some standard was needed in order to correct for non-standard conditions of temperature and pressure, so personnel would be able to input consistent corrections. Accordingly, the military settled on a standard temperature of 59 deg. Fahrenheit (15 deg. Celsius), a standard barometric pressure (corrected to sea level) of 29.53 inches of mercury, and a standard relative humidity of 78 percent. Since that time, the International Civil Aviation Organization (ICAO) has adopted the standards of 59 deg. Fahrenheit, 29.92 inches of mercury, and zero humidity, with these ICAO standards being adopted by the U.S. military in the early 1960s. However, sport shooters and hunters adapted the old U.S. military system in the early part of the twentieth century, and continue to use that system today for ballistics calibration. The specific standard used is not critical, so long as the atmospheric modeling system remains consistent throughout. Accordingly, the present inventors have developed certain methods for converting between the older U.S. military standard atmosphere to the ICAO standard atmosphere, in order to use data provided by various electronic devices available (e.g., the Kestrel 4000, an electronic anemometer and barometric pressure and temperature sensing device). An exact comparison of the two standards is beyond the scope of this document, but briefly there is an elevation difference (at equal density) ranging from about 600 feet at sea level, up to a difference of a bit less than one thousand feet at an altitude of ten thousand feet, between the older U.S. military standard atmosphere and the ICAO standard atmosphere. A major part of this difference, i.e. approximately four hundred feet, is mostly due to the difference in standard barometric pressures between the two standards. The balance is mostly due to the differences in modeling between the two standard atmospheres.

FIG. 6 provides an illustration of an ICAO density altitude determination chart 250. The chart 250 includes a temperature scale 252 along the lower edge, and a density altitude scale 254 along the left vertical edge. A series of sloping elevation lines 256a, 256b, 256c, etc. extend across the chart 250, and represent the pressure altitude (i.e., altitude corrected for non-standard pressure, but not for other factors) along those lines. A dashed line 258 representing standard temperature (and clearly indicating the decrease in standard temperature with altitude) is also shown across the graph or chart 250.

The density altitude determination chart 250 is used by first finding the actual temperature (in degrees Fahrenheit, although the chart 250 could include a Celsius scale, if so desired) along the horizontal scale 252, then forming a vertical line V3 from the temperature scale 252 upwardly until it intersects the appropriate elevation line (pressure altitude), e.g. 256c, 256d, etc. At that point, a horizontal line H2 is drawn to intersect the density altitude scale 254, to find the density altitude. As an example of the above, if the temperature is 95 deg. Fahrenheit at a pressure altitude of 4200 feet, one begins at the 95 deg. point along the temperature scale 252 and forms the line V3, extending upwardly to a point about one fifth of the way between the four thousand foot and five thousand foot pressure altitude lines 256c and 256d. A horizontal line H2 is formed from that point, to the left to intersect the density altitude scale at about the eight thousand foot point.

The above described procedure is standard for determining density altitude for virtually any purpose, e.g. aircraft performance in aviation, etc. However, it does not define the ballistic performance of a firearm bullet or projectile. In order to determine such ballistic performance, additional factors must be considered. FIGS. 7A and 7B provide a pair of density altitude ballistic correction charts or nomographs, respectively 260a for target distances ranging from about 500 yards to about 1200 yards, and 260b for target distances ranging from about one thousand yards to about 1700 yards. Each nomograph 260a and 260b includes a horizontal range scale, respectively 262a and 262b, and a series of curves 264a, 264b representing the density altitude. Each nomograph 260a, 260b also includes a series of positive and negative "minute of angle" or MOA correction factors 266a, 266b, represented by a series of horizontal rows of dots. Other correction factors or scales, e.g. the mil system, etc., may be used as desired.

As the previously calculated horizontal range to the target is about 710 yards in the ongoing example, the shorter range nomograph 260a will be used for this final calculation. First, the horizontal range is located along the lower horizontal range scale 262a. The "7" line is appropriate for this calculation, as a ten yard range difference does not noticeably affect the MOA correction factor in this calculation. One then follows (or forms) the selected vertical line, e.g. line V4 representing the seven hundred yard range mark on the nomograph 260a, upwardly until it reaches the curve 264a for the previously determined density altitude, e.g. eight thousand feet. This intersection point is about three quarters of the way between the horizontal zero correction line and the first MOA dot line immediately below, thus indicating a negative minute of angle or MOA correction of about ¾. The correction is negative due to the relatively high density altitude and correspondingly thinner air, resulting in less aerodynamic drag on the bullet and the corresponding need to aim slightly low due to the smaller amount of bullet drop. The marksman applies this ¾ MOA correction to the scope sight field, to arrive at a final aiming point for his target. This may be accomplished by means of conventional elevation adjustment for the reticle of the firearm scope, or alternatively the marksman may compare the needed MOA correction with a comparable angle subtended by a known span or height at the range of the target, and adjust his aim accordingly.

Figure 8:
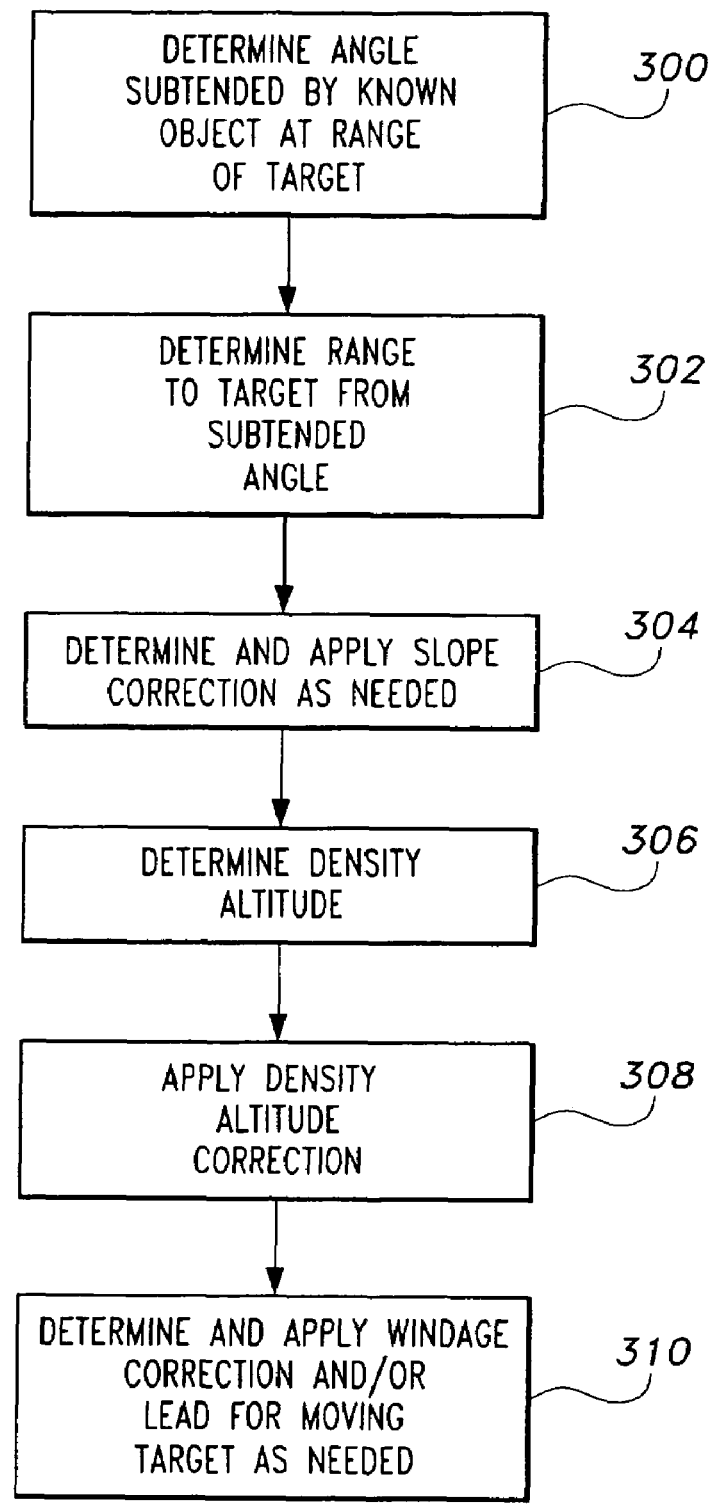
FIG. 8 is a flow chart describing the basic steps in the method of use of the present multiple nomograph system.

FIG. 8 provides a flow chart summarizing the above procedure. Initially, the marksman or hunter measures the angle subtended by the target (or object of known size adjacent to the target) using the horizontal or vertical angle measurement stadia 100 (shown with the elevation and windage aim point field of FIG. 3), generally as indicated by the first step 300 of FIG. 8. Once the angle (mils, MOA, etc.) is known, the hunter or marksman applies this information to the distance v. angular measurement nomograph of FIG. 4, which may be located within the scope reticle or externally to the reticle field. This step is generally indicated as the second step 302 of FIG. 8.

At this point, the marksman must apply any correction for elevation difference (if any) between the firearm and the target, generally as indicated by the third step 304 of FIG. 8. This is accomplished by means of the slope and wind correction nomograph 200, shown in detail in FIG. 5. The shooter may also use this nomograph to determine the crosswind component for any wind blowing across the range between the firearm and target, as explained further above.

Correction for non-standard atmospheric conditions is applied at this point, generally as indicated by the fourth and fifth steps 306 and 308 of FIG. 8. First, the marksman must determine the density altitude. This may be accomplished by means of an electronic device, if the shooter is so equipped, or by means of various types of simple slide rule type calculators, e.g. the "denalt" (density altitude) calculator widely known in aviation. If no such device is available, the shooter may use the density altitude determination nomograph or chart 250, shown in detail in FIG. 6 of the drawings. Once the density altitude has been determined, the shooter applies the density altitude to the selected one of the ballistic correction nomographs 260a or 260b respectively of FIGS. 7A and 7B, depending upon the previously determined distance to the target. At this point, the hunter or marksman may apply the correction(s) derived in accordance with the above steps to the elevation and windage aim point field 50 as viewed through the scope reticle of FIG. 2, along with any windage and/or moving target lead correction needed, generally in accordance with the final step 310 of FIG. 8, to arrive at an accurate aim point for the target.

In conclusion, the present multiple nomograph system for solving ranging and ballistic problems in firearms provides the serious marksman with a non-electronic means of solving all of the most critical problems or factors affecting the accuracy of a shot once the bullet leaves the muzzle of the firearm. It is anticipated that many shooters will use electronic devices to determine density altitude, crosswind component, and perhaps other factors, but where such electronic means are not available, e.g. due to prohibition in competition or malfunction of the device, the present non-electronic nomograph system will provide an extremely accurate method of resolving the various factors which affect the accuracy of a shot. Moreover, the present system may be incorporated entirely within the reticle of a firearm scope, if so desired, thus allowing the marksman to keep his eye on the target at all times. However, many of the various nomographs which are not critical for aiming per se, e.g. density altitude, slope, etc., may be provided alternatively by means of some other media, e.g. plastic or paper, or disposed within a spotter scope, etc., as desired. Accordingly, the present multiple nomograph system will provide all serious shooters with the means to resolve all of the most critical factors affecting the trajectory of a bullet, and thus consistently produce extremely accurate shots at virtually any practicable range.

It is to be understood that the present invention is not limited to the embodiments described above, but encompasses any and all embodiments within the scope of the following claims.

We claim:

1. A multiple nomograph system for solving ranging and ballistic problems in firearms, comprising:
 a firearm scope;
 a reticle disposed within said firearm scope;
 a multiple point elevation and windage aim point field disposed upon said reticle;
 horizontal and vertical angular measurement stadia disposed upon said reticle;
 a distance v. angular measurement nomograph, corresponding to said horizontal and vertical angular measurement stadia;
 a slope and wind correction nomograph; and
 at least one density altitude nomograph.

2. The multiple nomograph system for solving ranging and ballistic problems in firearms according to claim 1, wherein at least one of said distance v. angular measurement nomograph, said slope and wind correction nomograph, and said at least one density altitude nomograph is disposed externally to said firearm scope.

3. The multiple nomograph system for solving ranging and ballistic problems in firearms according to claim 1, wherein said elevation and windage aim point field is laterally skewed for precession compensation.

4. The multiple nomograph system for solving ranging and ballistic problems in firearms according to claim 1, wherein said at least one density altitude nomograph comprises a density altitude determination chart and at least one density altitude ballistic correction nomograph.

5. The multiple nomograph system for solving ranging and ballistic problems in firearms according to claim 1, further including polygonal stadia alignment markings disposed at least upon said horizontal and vertical angular measurement stadia.

6. A multiple nomograph system for solving ranging and ballistic problems in firearms, comprising:
 a firearm scope;
 a reticle disposed within said firearm scope;
 at least one elevation and windage aim point disposed upon said reticle;
 horizontal and vertical angular measurement stadia disposed upon said reticle; and
 at least a distance v. angular measurement nomograph, corresponding to said horizontal and vertical angular measurement stadia.

7. The multiple nomograph system for solving ranging and ballistic problems in firearms according to claim 6, wherein said at least one elevation and windage aim point comprises a multiple point elevation and windage aim point field.

8. The multiple nomograph system for solving ranging and ballistic problems in firearms according to claim 7, wherein said elevation and windage aim point field is laterally skewed for precession compensation.

9. The multiple nomograph system for solving ranging and ballistic problems in firearms according to claim 6, further including:
 at least one slope and wind correction nomograph; and
 at least one density altitude ballistic correction nomograph.

10. The multiple nomograph system for solving ranging and ballistic problems in firearms according to claim 9, wherein at least one of said distance v. angular measurement nomograph, said slope and wind correction nomograph, and said at least one density altitude ballistic correction nomograph is disposed externally to said firearm scope.

11. The multiple nomograph system for solving ranging and ballistic problems in firearms according to claim 9, further including a density altitude determination chart.

12. The multiple nomograph system for solving ranging and ballistic problems in firearms according to claim 6, further including polygonal stadia alignment markings disposed at least upon said horizontal and vertical angular measurement stadia.

13. A multiple nomograph system for solving ranging and ballistic problems in firearms, comprising:
 a firearm scope;
 a reticle disposed within said firearm scope;
 at least one elevation and windage aim point disposed upon said reticle;
 horizontal and vertical angular measurement stadia disposed upon said reticle;
 a density altitude determination chart; and
 at least one density altitude ballistic correction nomograph.

14. The multiple nomograph system for solving ranging and ballistic problems in firearms according to claim 13, wherein said at least one elevation and windage aim point comprises a multiple point elevation and windage aim point field.

15. The multiple nomograph system for solving ranging and ballistic problems in firearms according to claim 14, wherein said elevation and windage aim point field is laterally skewed for precession compensation.

16. The multiple nomograph system for solving ranging and ballistic problems in firearms according to claim 13, further including:
 a distance v. angular measurement nomograph, corresponding to said horizontal and vertical angular measurement stadia; and
 at least one slope and wind correction nomograph.

17. The multiple nomograph system for solving ranging and ballistic problems in firearms according to claim 16, wherein at least one of said distance v. angular measurement nomograph, said slope and wind correction nomograph, and said at least one density altitude ballistic correction nomograph is disposed externally to said firearm scope.

18. The multiple nomograph system for solving ranging and ballistic problems in firearms according to claim 13, further including polygonal stadia alignment markings disposed at least upon said horizontal and vertical angular measurement stadia.

19. A multiple nomograph system for solving ranging and ballistic problems in firearms, comprising:
- a firearm scope;
- a reticle disposed within said firearm scope;
- at least one elevation and windage aim point disposed upon said reticle;
- horizontal and vertical angular measurement stadia disposed upon said reticle; and
- a plurality of polygonal stadia alignment markings evenly disposed upon at least said horizontal and vertical angular measurement stadia.

20. The multiple nomograph system for solving ranging and ballistic problems in firearms according to claim 19, wherein said at least one elevation and windage aim point comprises a multiple point elevation and windage aim point field.

21. The multiple nomograph system for solving ranging and ballistic problems in firearms according to claim 20, wherein said elevation and windage aim point field is laterally skewed for precession compensation.

22. The multiple nomograph system for solving ranging and ballistic problems in firearms according to claim 19, further including:
- a distance v. angular measurement nomograph, corresponding to said horizontal and vertical angular measurement stadia;
- at least one slope and wind correction nomograph; and
- at least one density altitude nomograph.

23. The multiple nomograph system for solving ranging and ballistic problems in firearms according to claim 22, wherein at least one of said distance v. angular measurement nomograph, said slope and wind correction nomograph, and said at least one density altitude nomograph is disposed externally to said firearm scope.

24. The multiple nomograph system for solving ranging and ballistic problems in firearms according to claim 22, wherein said at least one density altitude nomograph comprises a density altitude determination chart and at least one density altitude ballistic correction nomograph.

* * * * *